May 31, 1960  C. M. KRACHT  2,938,296
FISHHOOK
Filed Dec. 14, 1956

INVENTOR.
Carl M. Kracht
BY
Garvey & Garvey
ATTYS

United States Patent Office 2,938,296
Patented May 31, 1960

2,938,296

FISHHOOK

Carl M. Kracht, 109 W. 10th St., Muscatine, Iowa

Filed Dec. 14, 1956, Ser. No. 628,395

2 Claims. (Cl. 43—43.16)

This invention relates to an improved fishhook designed to embed itself in either the upper or lower jaw of fish.

It has long been known that conventional fishhooks are generally unsatisfactory due to the fact that fish which have been "hooked" frequently work their way loose. This occurs because the barb of the hook becomes embedded in the side or corner of the fish's mouth where the flesh is thin and consequently is easily torn. Various hooks have been designed with a view toward solving this problem, by providing means for turning the hook so that the hook barb will engage the upper or lower jaw of the fish's mouth. Illustrative of such hooks are Patent No. 2,101,491 granted to L. S. Chilcott December 7, 1937 and Patent No. 1,706,881 granted to L. Hampson March 26, 1929. I have found that these hooks only partially solve the aforementioned problem since, inter alia, they require a pulling force to be exerted on the line in order to effect turning of the hook to the proper position for engaging the upper or lower jaw of the fish. As a consequence, a fish can nibble the bait and slip off the hook before the fisherman is aware that it is on the line.

It is the principal object of this invention to provide a fishhook so constructed that it will automatically adjust to the proper position for embedding the barb of the hook into the upper or lower jaw of the fish, when the latter nibbles the bait, thereby minimizing any likelihood that the fish will slip off the hook.

Another object is to provide a fishhook of the character described, the adjustment of which is automatically effected by a turning of the fishhook when the fish bites the bait at any point along the hook shank.

Other objects of the invention will be manifest from the following description of the invention, taken in connection with the accompanying drawings, wherein.

Figure 4:
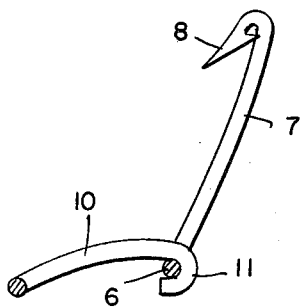
Fig. 4 is a sectional view taken along the lines 4—4 of Fig. 3, looking in the direction of the arrows.

Referring now in greater detail to the drawing, the fishhook of the present invention is formed from a strand of suitable material, preferably resilient wire. This strand is bent to provide a shank 6, one end of which is curved to form a hook 7 which issues into a barb 8. The opposite end of shank 6 is coiled to form an eye 9 adapted for the reception of a fishing line. From eye 9 the strand extends forwardly toward hook 7, in spaced relation to shank 6 and constitutes a bow section 10, the terminal of which is bent upwardly and hooked at 11 for engagement with shank 6 at a point adjacent hook 7. It will be noted from Fig. 4 that the plane in which shank 6 and bow section 10 lie, is at approximately a right angle to the plane of hook 7 and barb 8, for reasons which will be more fully hereinafter set out. As is apparent from the drawing, and particularly Fig. 1, the eye 9 is formed by convoluting the wire strand to intensify the resilient action of bow section 10 for a purpose which will hereinafter be better understood.

Figure 1:
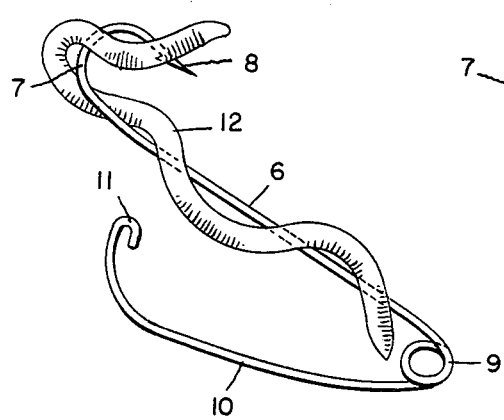
Fig. 1 is a perspective view of the fishhook of the present invention, illustrating the manner of baiting the hook.
Figure 2:
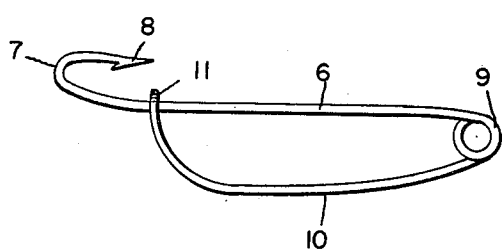
Fig. 2 is a side elevational view of the fishhook per se.
Figure 3:
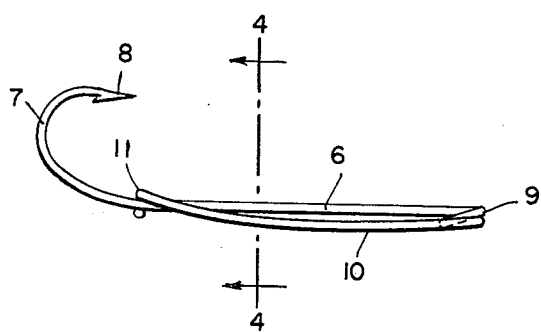
Fig. 3 is an edge elevational view of the same.

In baiting the fishhook of the present invention, hook terminal 11 of bow section 10 is disengaged from shank 6 and bait 12 is threaded on the shank in a well known manner, as shown to advantage in Fig. 1. Hook terminal 11 is then latched to shank 6.

In use, if the plane in which bow section 10 and shank 6 lie, is the same as the plane of the fish's mouth, then hook 7 and barb 8 are properly positioned to engage the upper and lower jaw of the fish. However, when the plane of the bow section and shank is not the same as the plane of the fish's mouth, then shortly after the barb enters the fish's mouth, the teeth of the fish will reach the point where the single shank ends and the shank-bow section structure begins. From this point on, pressure anywhere along the shank and bow sections by the jaws of the fish, causes the hook to flip in the fish's mouth so that the bow and shank lie in the same plane as the fish's mouth. Since the horizontal dimension of the fish's mouth is considerably greater than the vertical dimension, the turning of the barb as the fish bites down on the shank-carried bait, will cause the barb to become firmly embedded in either the upper or lower jaw of the fish. With the present fishhook, the fish automatically hooks itself, when the bait is taken into the mouth and the jaws close, even if the fisherman is totally unaware of its presence. Also, the tension of bow section 10 is sufficiently strong that the pressure of the fish's mouth causes the hook to turn, rather than to unlatch the bow from the shank. If desired, hook terminal 11 may of course be permanently affixed to shank 6.

While I have herein described a preferred embodiment of my invention, it is nevertheless to be understood that various changes may be made therein, without departing from the spirit and scope of the appended claims.

What I claim is:

1. A fishhook including a strand of resilient wire, one end of which is hook-shape and its extremity formed to provide a barb, an intermediate part of the strand being adapted for the reception of bait trained thereon over the barbed hook extremity, the opposite end of the strand being convoluted to provide a resilient eye and bent towards the hook to form a bow section, said bow section being substantially spaced from the intermediate bait-carrying part of the strand, from the resilient eye to a point adjacent the hook-shaped end of the strand, the free end of the bow section being detachably engageable with the bait-carrying part of the strand at a point adjacent the hook-shaped end thereof, the plane of said shank and bow section being disposed at an angle to the plane of the hook-shaped end of the wire, the fishhook being rotated about its longitudinal axis upon pressure being exerted along the shank and bow section by the jaws of the fish so that the shank and bow section lie in the same plane as the fish's mouth and the hook barb is firmly embedded in either the upper or lower jaw of the fish.

2. A fishhook comprising a bait-carrying shank, one end of which is hook-shape and its extremity formed to provide a barb, the other terminal of which shank is bent towards the hook to form a bow section and having means for releasable interlocking engagement with said shank, said bow section being substantially spaced from the bait-carrying shank, from a point proximate the terminal of the shank remote from the barb to a point adjacent the barb, the bow section and shank lying in a plane at an angle to the plane of the hook-shape end of said shank, the fishhook being rotated about its longitudinal axis upon pressure being exerted along the shank and bow section by the jaws of the fish so that the shank and bow section lie in the same plane as the fish's mouth and the hook barb is firmly embedded in either the upper or lower jaw of the fish.

References Cited in the file of this patent

UNITED STATES PATENTS

| | | |
|---|---|---|
| 580,915 | Welch | Apr. 20, 1897 |
| 1,150,386 | Rife | Aug. 17, 1915 |
| 1,706,881 | Hampson | Mar. 26, 1929 |
| 2,101,491 | Chilcott | Dec. 7, 1937 |
| 2,148,074 | Kaspick | Feb. 21, 1939 |
| 2,215,612 | Hathaway | Sept. 24, 1940 |
| 2,679,708 | Matthes | June 1, 1954 |
| 2,710,481 | Matthes | June 14, 1955 |